United States Patent

[11] 3,609,712

[72] Inventor Robert H. Dennard
Croton-on-Hudson, N.Y.
[21] Appl. No. 791,220
[22] Filed Jan. 15, 1969
[45] Patented Sept. 28, 1971
[73] Assignee International Business Machines Corporation
Armonk, N.Y.

[54] INSULATED GATE FIELD EFFECT TRANSISTOR MEMORY ARRAY
30 Claims, 5 Drawing Figs.

[52] U.S. Cl. .......... 340/173 FF, 307/238, 307/279
[51] Int. Cl. .......... G11c 11/40, H03k 3/286
[50] Field of Search .......... 307/238, 279; 340/173, 173 SP, 173 SS, 173 FF

[56] References Cited

UNITED STATES PATENTS

| | | | |
|---|---|---|---|
| 3,196,405 | 7/1965 | Gunn .......... | 340/173 |
| 3,373,295 | 3/1968 | Lambert .......... | 340/173 |
| 3,506,851 | 4/1970 | Polkinghorn .......... | 340/173 |

*Primary Examiner*—Terrell W. Fears
*Attorneys*—Hanifin and Jancin and T. J. Kilgannon, Jr.

ABSTRACT: A bit oriented integrated circuit insulated gate field effect transistor memory array is disclosed which includes decoding on a semiconductor chip for both word and bit lines. Decoders which incorporate a combination of NOR logic elements and inverters provide for selection of a pair of bit lines and a single word line such that information can be written into a field effect transistor bistable circuit memory cell associated with these word and bit lines. Decoder controlled bit line switches in the form of field effect transistors are enabled to close the circuit between the bit driver and a column of memory cells. Also disclosed is a bit line biasing technique which eliminates the possibility of false writing into unselected memory cells. This is accomplished by applying a voltage via a resistance to the bit lines or by intermittently applying an appropriate voltage to the bit conductors associated with unselected memory cells.

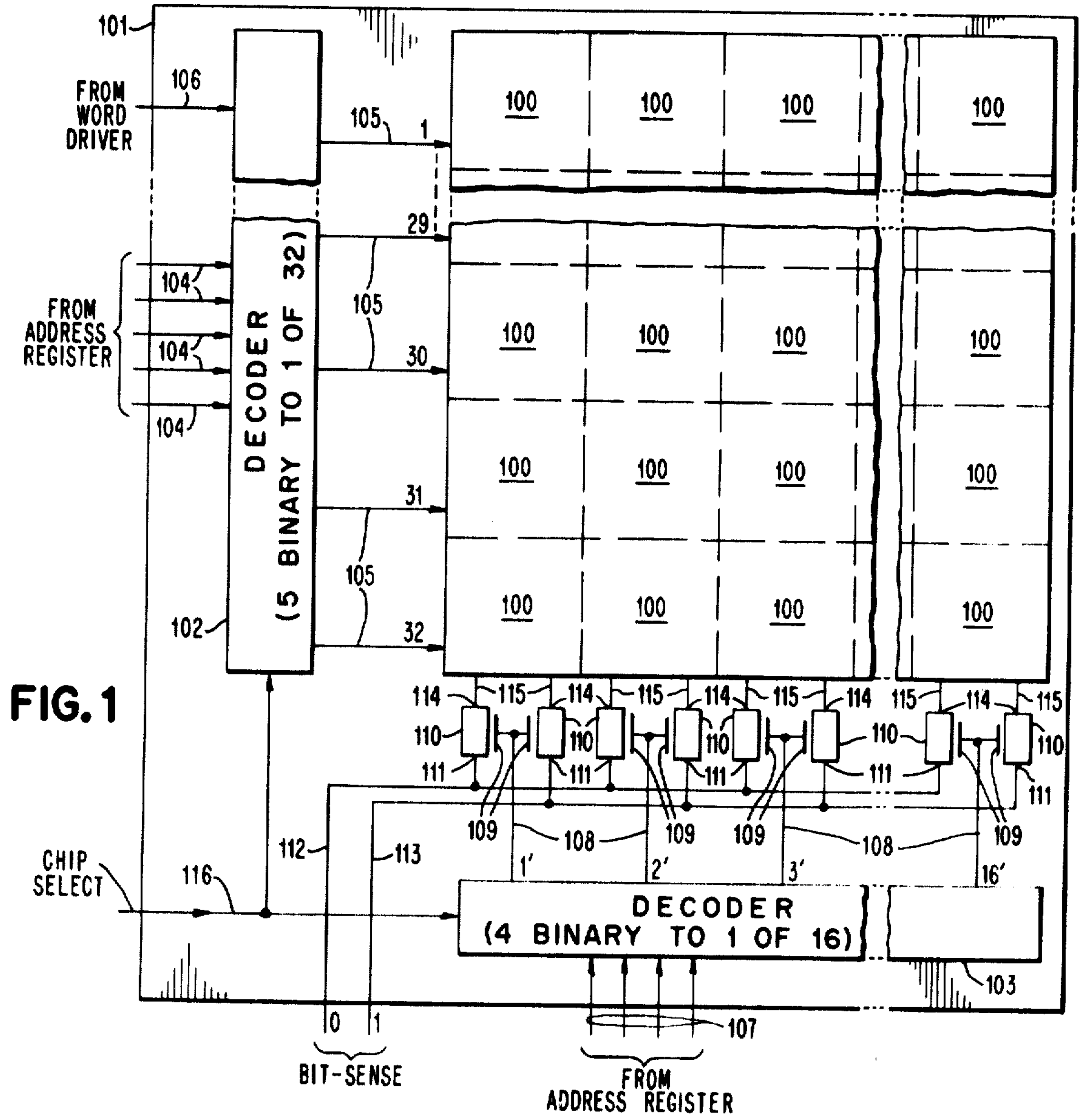
FIG. 1
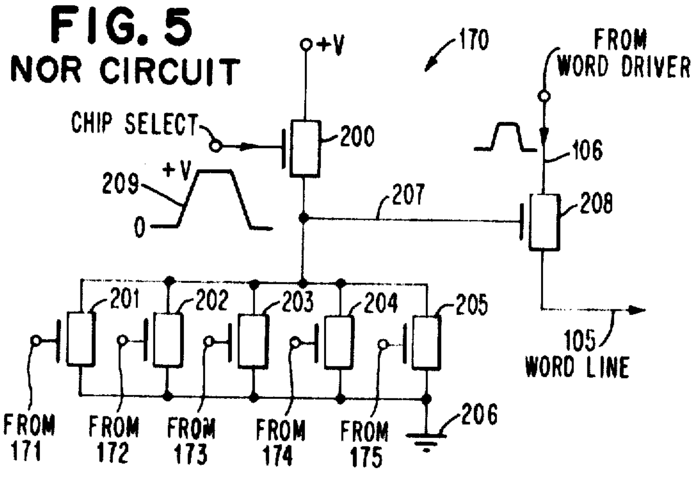
FIG. 5 NOR CIRCUIT
INVENTOR
ROBERT H. DENNARD
BY Thomas J. Kilgannon Jr.
ATTORNEY

DECODER CIRCUIT

INVERTER CIRCUIT

INSULATED GATE FIELD EFFECT TRANSISTOR MEMORY ARRAY

BACKGROUND OF THE INVENTION

1. Field of the Invention

This invention relates generally to arrangements which store information in binary form. More particularly, it relates to an integrated circuit arrangement which incorporates field effect transistor bistable circuits as memory cells, bit and word line decoders on the same semiconductor chip which contains the array of memory cells, and bit conductor biasing means coupled to unselected bit conductors. As a result of the combination of elements false or spurious writing of information into unselected memory cells during the reading or writing of a selected bit is eliminated. The combination of the bit conductor biasing means with decoding means for selecting a single bit for reading or writing is particularly important in bit oriented arrays because a source of error is eliminated which is not present in word oriented arrays of the same type.

2. Description of the Prior Art

The problem solved by the present invention appears to be unique to bit oriented arrays wherein the individual memory cells are made up of field effect transistors. Most known field effect transistor memory arrays are word oriented, that is, a number of memory cells associated with a word line, each adapted to store a bit of information and forming a binary word, are simultaneously written into or read in parallel. Thus, whenever a word line is energized, a circuit is formed for all cells to pass current through the ON device of a bistable circuit. The resulting current flow is sensed in sense amplifiers associated with each bit line. When the word line is deenergized, the input/output devices of each cell disconnect the cell from the bit conductors.

In the present application, the above-described action takes place with respect to one selected cell. All the other cells associated with the same word line have their associated input/output devices turned ON in a manner similar to that for the selected cell. The bit lines or conductors of the unselected cells, however, are disconnected from the bit driver and sense amplifier by the opening of serially disposed bit line switches which are responsive to signals from a decoder. The bit lines associated with an unselected memory cell "see" a high voltage and a low voltage at the nodes of the cell via the closed input/output devices. During the time the input/output devices of an unselected cell are closed, the bit line capacitance of each bit line charges toward the potential of its associated node. Opening of the input/output devices, when the word drive pulse is terminated, leaves the bit line associated with the low voltage node at a lower potential than previously. After a number of read or write cycles, (e.g. of the same cell) the potential on a bit line is reduced to substantially ground potential. Under such circumstances, another unselected memory cell, when its word line is energized, can encounter conditions of a low voltage on one of its bit lines and cause false information to be written into that memory cell. The only prior art known, is the application of a voltage via a load resistor to maintain a proper voltage on the node of a field effect transistor bistable circuit (which would otherwise decay due to leakage). The maintenance of voltage on a memory cell node, however, does not solve the problem of false writing in unselected memory cells of bit-oriented memory arrays. Because the problem of false writing of unselected memory cells in bit oriented memory arrays detracts substantially from their value, the present invention should enhance their reliability to a point where they are competitive with word oriented memory arrays of the same general type.

SUMMARY OF THE INVENTION

The apparatus of the present invention in its broadest aspect comprises, in combination, a bit-oriented array of memory cells each of which stores information via word and bit conductors and bit line biasing means coupled to the bit conductors to maintain the voltage on the bit conductors above a given level. The application of an appropriate bias to the bit conductors on a constant or intermittent basis eliminates the possibility of false writing into unselected memory cells because such cells "see" potentials which are indicative of a writing condition when their associated word lines are energized.

In accordance with a more specific aspect of the invention, an array of field effect transistor memory cells with their associated word and bit conductors and word and bit decoders are fabricated on a semiconductor substrate. These elements in conjunction with appropriate word and bit drivers form a bit-oriented memory system. The array in combination with bit line biasing means forms a memory array which is not subject to error due to false writing of unselected bits. The bit line biasing means specifically includes in one embodiment a source of voltage the potential of which may be applied via a resistance to each of the bit conductors of the array at all times. In another embodiment, it may consist of a source of voltage and a switchable element such as a field effect transistor which, when actuated, applies voltage to the bit conductors only when none of the word conductors are energized. The voltage provides a potential which is approximately equal to the highest potential to which the internal nodes of the field effect transistor memory cell is charged during writing.

It is, therefore, an object of this invention to provide a method and apparatus which eliminates the possibility of false or spurious writing in a bit-oriented field effect transistor array.

Another object is to provide a method and apparatus for eliminating false or spurious writing of unselected bits which is both simple and inexpensive.

Still another object is to provide method and apparatus for biasing the bit conductor which materially enhances the reliability of bit-oriented memory arrays.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a partial schematic, partial block diagram showing the organization of bit-oriented memory array which utilizes memory cells made up of field effect transistors (FET's).

FIG. 2 includes arrangements which prevent the bit conductors from discharging to ground and providing conditions for false or spurious writing of an unselected cell.

FIG. 5 is a schematic diagram showing a NOR circuit used in the decoder of FIG. 3 and a word line driver.

DESCRIPTION OF A PREFERRED EMBODIMENT

Figure 2:
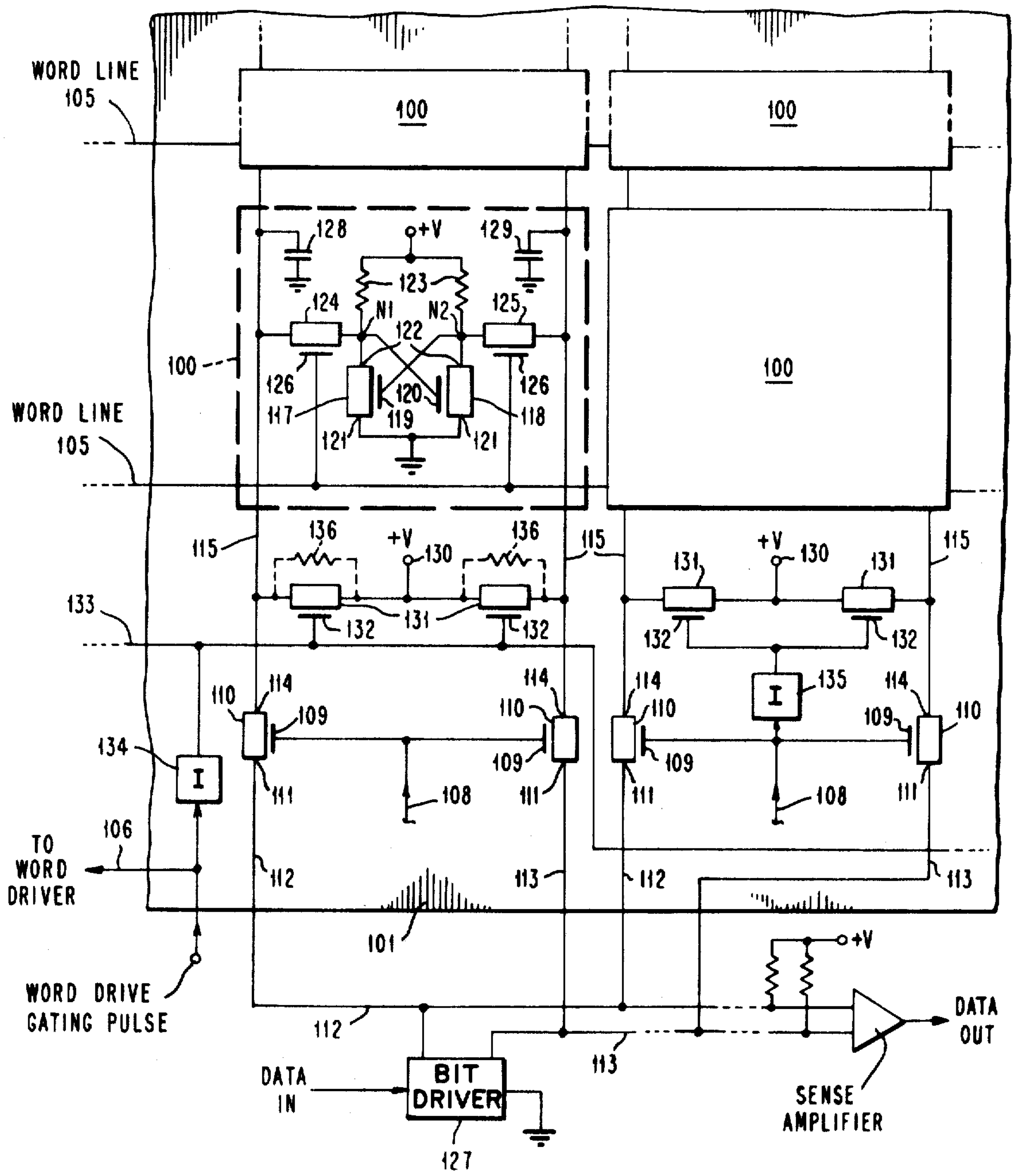
FIG. 2 is a partial schematic, partial block diagram of a portion of the array of FIG. 1 showing the memory cell utilized at each bit position in the array of FIG. 1.

Referring now to FIG. 1, there is shown a partial schematic, partial block diagram of a memory array having a bit-oriented organization. For purposes of the present invention, a "bit-oriented" memory array shall mean that only one memory cell of an array is written into or read at any instant. In FIG. 1, a plurality of memory cells represented by blocks 100 are shown arranged in rows and columns on the surface of a semiconductor chip 101, which may be made of silicon or other suitable semiconductor material. Also formed on the surface of semiconductor chip 101 are word and bit decoders represented by blocks 102 and 103, respectively. Decoder 102 may be any suitable decoder which, for example, converts a 5-bit binary address into a one out of 32 selection. In FIG. 1, five address leads 104 are connected to decoder 102 and provide the address information to it from an address register (not shown) which is disposed off chip 101. A suitable decoder will be described herein in some detail in connection with FIGS. 3–5, so, suffice it to say, at this time, that decoder 102 provides 32 outputs via word lines 105 each of which is associated with rows of memory cells 100. Each row of memory cells 100 is designated in FIG. 1 by the numbers 1 to 32 which are positioned to the left of each row of memory cells 100 and adjacent to the word line 105 associated with that row.

A word driver lead 106 is shown connected to decoder 102. Lead 106 provides a signal from a word driver (not shown) which can be applied to any word line 105. Only one word line 105, however, is energized because decoder 102 has selected only one word line 105 and enabled it via a gating device. This will be seen in some detail in what follows when FIG. 5 is described.

Decoder 103 may be similar in every respect to decoder 102 except that the number of input and output leads are different. The number of bit positions required and the organization and timing requirements determine decoder requirements. In the exemplary arrangement of FIG. 1, four binary inputs are applied via address leads 107 to decoder 103 to provide a one out of 16 selection of decoder output leads 108. Decoder output leads 108 are associated with 16 columns of memory cells 100 and each column is designated by the reference number 1′ to 16′ which are positioned to the right of each output lead 108 associated with a particular column. It should be apparent, at this point, that 512 storage positions are available in the exemplary array.

Decoder output leads 108 are shown in FIG. 1 each connected to the gate electrodes 109 of a pair of field effect transistors 110 (hereinafter called FET's). The sources 111 of the leftmost of the pairs of transistors are connected in parallel to one of a pair of bit-sense conductors 112, while the sources 111 of the rightmost of the pairs of transistors 110 are connected in parallel to the other of a pair of bit-sense conductors 113. Conductors 112 and 113 have also been designated in FIG. 1 by the numerals 0 and 1, respectively, at the boundary of chip 101 to indicate that binary "zero" and binary "one" signals are applied respectively to conductors 112, 113 to write a binary "one" state, into the memory. Reversal of the signals applied to these leads, of course, writes the opposite state into memory. Each of the drains 114 of FET's 110 is connected to a bit conductor 115, each pair of which is connected to a column of memory cells 100. A chip select lead 116 is shown connected to decoders 102 and 103, to energize the logic involved in the decoder only when a particular memory cell 100 in the array is required. Power consumption is reduced by this expedient and, a further discussion will be made of this feature in connection with the description of FIG. 5.

The array in FIG. 1 operates as follows when writing into a selected memory cell:

A signal via chip select lead 116 enables decoder 102 and 103 which, in response to address signals on address leads 104, 107, respectively, selects a word line 105 and a decoder output lead 108. Assuming that the addresses provided select row 32 and column 1′, word line 105 associated with row 32 is enabled and, a potential is applied to gate electrodes 109 of the pair of FET's 110 via output lead 108 associated with column 1′, which enables or turns on these transistors. At this point, a signal is applied via word driver lead 106 to word line 105 associated with row 32 and a signal is provided over one of leads 112, 113 which passes via one of enabled FET's 110 and one of bit conductors 115 to activate memory cell 100 which is disposed at the intersection of column 1′ and row 32.

Reading of information stored at a bit storage position at the intersection of row 32 and column 1′ is accomplished by enabling decoders 102 and 103 in the same manner as described above for writing. FET's 110 associated with bit conductors 115 are closed and bit sense conductors 112, 113 are held at a positive potential from a source (not shown). Upon selection of word line 105 associated with row 32, the input/output devices associated with that row are energized. Since current flows only for the selected bit since all other FET's 110 are opened. Current flows from a source of voltage (not shown) associated with bit sense conductors 113, 114, via one of these conductors through FET 110 and bit conductor 115 to memory cell 100, where the current passes via a conductive input/output device through the ON device of a bistable circuit to ground. This current is sensed in a sense amplifier (not shown). Removal of a signal from chip select lead 116 terminates both reading and writing operations.

Up until this point, nothing has been said concerning the possibility of writing false information into unselected memory cells. FIG. 1 shows the basic organization of a bit-oriented memory and some detailed discussion was provided because it is because of the very nature of bit-oriented memories that the problem of false writing arises. Recalling that only one decoder output lead 108 and consequently only one pair of bit lines 115 was enabled during writing into a selected memory cell and that only one word line 105 was enabled, it should be clear that all other FET's 110 which can now be characterized as bit line switches, remain open. The same situation occurs during the reading of a selected memory cell 100 except that no signals are applied to the selected cell over conductors 112, 113. Thus, any cell which is not in the selected column "sees" an open circuit as a result of the open bit line switches 110 associated with each column of cells. The application of a read pulse to the word line 105 associated with the selected cell, however, is also applied to the unselected cells 100 in the same row. As a result of this, the bit conductor capacitances of an unselected column during either a reading or writing operation are charged toward the cell voltages via the enabled input/output devices associated with each memory cell. Since one of the cell voltages is at substantially ground potential, one of the bit conductor capacitances will charge toward ground potential. A subsequent selection of the word line of a different unselected cell having the same bit conductors set up a condition which can lead to a false writing of that cell. The second unselected cell has its input/output devices turned ON via its word conductor. Since one of its associated bit conductors is at substantially ground potential, and this is a condition for writing, the unselected cell can be written to a state which is opposite to that of the information supported to be stored in the cell. Clearly this is undesirable. The foregoing discussion will become clearer after a consideration of FIG. 2, and the following more detailed discussion.

FIG. 2 is a partial schematic, partial block diagram of a portion of the array of FIG. 1 showing a memory cell utilized at each bit position and, including arrangements which prevent the occurrence of flase or spurious writing referred to hereinabove.

Elements in FIG. 2 which are the same as the element in FIG. 1 are identified by the same reference numbers. Four memory cells 100 of the array of memory cells of FIG. 1 are shown in FIG. 2, one of which is shown schematically in detail. Cell 100, shown in detail, consists of FET's 117, 118, the gates 119, 120 of which are, respectively cross-coupled to nodes N1, N2, respectively. The sources 121 of FET 117, 118 are connected to ground while their drains 122 are connected via load resistors 123 to a source of voltage +V, for example, when the FET's used are NPN devices. Input/output FET's 124, 125 are shown connected between bit conductors 115 and nodes N1 and N2, respectively. Word line 105 is commonly connected to the gates 126 of each of the input/output FET's 124, 125 of all memory cells 100 in the same row.

Assume for purposes of exposition that the nodes N1 and N2 have been charged to ground potential and the potential +V, respectively, by applying a potential via word line 105 to the gates 126 of input/output devices 124 and 125 which, in effect, connected nodes N1 and N2 to bit conductors 115. As part of this operation, bit line switches 110 are closed in response to a signal from the decoder 103 (not shown) via output lead 108. Bit driver 127 then applies ground potential via conductor 112, bit conductor 115 and input/output device 124 to node 1. At the same time, the voltage +V is applied via conductor 113, bit line switch 110, bit conductor 115 and input/output FET 125 to node N2. At the termination of the word and bit driver pulses, bit line switches 110 and input/output devices 124, 125 are opened and information has been written into memory cell 100. For a more detailed explanation of the operation of the memory cell just described, reference may be made to an article entitled "An Investigation of The Potential Of MOS Transistor Memories" by P. Pleshko and L. Terman in IEEE Transactions on Electronic Computers, EC 15, No. 4, Aug. 1966.

Assume now that memory cell 100 immediately to the right of the memory cell just discussed is written into in the same manner. The memory cell which has been previously written into has its input/output devices 124, 125 closed as a result of the subsequent writing. Since the associated bit line switches 110 are open, nodes N1 and N2 tend to charge the bit line capacitances 128, 129 of their associated bit conductors to the voltage at these nodes. Accordingly, bit line capacitance 128 is charged toward ground potential and bit line capacitance 129 is charged to the potential +V.

Assume further that memory cell 100 at the upper right in FIG. 2 is selected for reading or writing. This action energizes the word line 105 associated therewith and as a result the input/output devices of memory cell 100 on the upper left of FIG. 2 are closed, in effect, connecting bit conductors 115 to the bit line capacitances 128, 129. Since capacitance 128 is substantially at ground potential, node N1 of upper left memory cell 100 of FIG. 2 will "see" ground potential and node N2 thereof a positive potential, thereby writing information into that cell when writing is not intended. As a practical matter, the above-described situation occurs when the bit line capacitance is larger than the capacitance from node N1 to ground.

Figure 4:
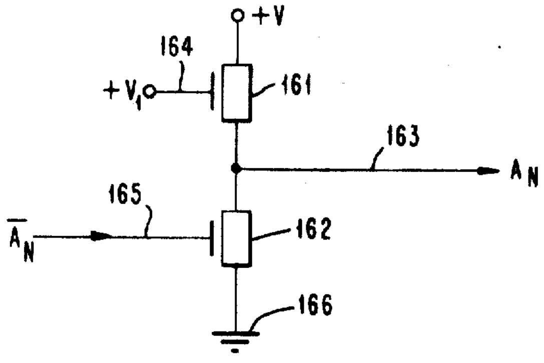
FIG. 4 is a schematic diagram of an inverter circuit used in the decoder of FIG. 3.

To eliminate this unintended or false writing which may occur any time, an unselected cell has its word line energized, the bit line capacitances of unselected bit conductors may be charged up to the highest value of potential which may appear at the nodes of any of the memory cells. In the present instance, the nodes N1 and N2 can charge to the potential +V. Charging of the bit line capacitances is preferably accomplished on an intermittent basis. This may be accomplished as shown in FIG. 2 by providing a source of voltage +V shown at 130 in FIG. 2 which is connected to bit conductors 115 by switchable elements 131, shown as field effect transistors, the gates 132 of which are connected to a source of potential via conductor 133. At this point, it should be appreciated that a similar pair of switchable elements 131 and voltage source 130 are associated with each pair of bit conductors of the array, and all switchable elements 131 are commonly connected via their gates to conductor 133. A source of potential in the form of an inverter 134 may be connected between word driver lead 106 and conductor 133 so that the termination of the word driver gating pulse applies a potential to the gates 132 of FET's 131. When switchable elements 131 are turned ON, the bit line capacitances 128, 129 associated with each of the bit conductors 115 are charged up to the potential +V. The voltages at the nodes N1 and N2 of the memory cells 100 are, of course, unaffected because, in one instance, the node is at the potential +V and, in the other instance, the node is held at ground potential by the ON FET 117, for example, of the memory cell 100. Inverters suitable for use in the above-described charging technique will be described in detail when FIG. 4 is considered.

Since the problem of false writing occurs only when bit line switches 110 are open, it follows that the potential +V from source 130 need only be applied to bit conductors 115 when switches 110 are opened. In FIG. 2, the application of a potential on decoder output lead 108 closes bit line switches 110. The application of this same potential from lead 108 to an inverter 135 turns FET's 131 to the ON condition when the actuating potential is removed from lead 108. The arrangement just described is shown below the rightmost memory cell 100 in FIG. 2. In this embodiment, an inverter 135 is required for each pair of bit lines 115 and, as a result is less preferable to the arrangement which incorporates inverter 134 which drives all the FET's 110 in parallel.

As an alternative to the intermittent charging technique described above, charging of the bit line capacitance may be accomplished on a continuous basis by simply substituting resistors 136 (shown in dotted lines in FIG. 2) for switchable elements 131. This approach to eliminating false writing is less preferable than the intermittent approach because, during reading, sensing current is drawn through resistors 136 resulting in reduced sense current output on the selected bit line.

Figure 3:
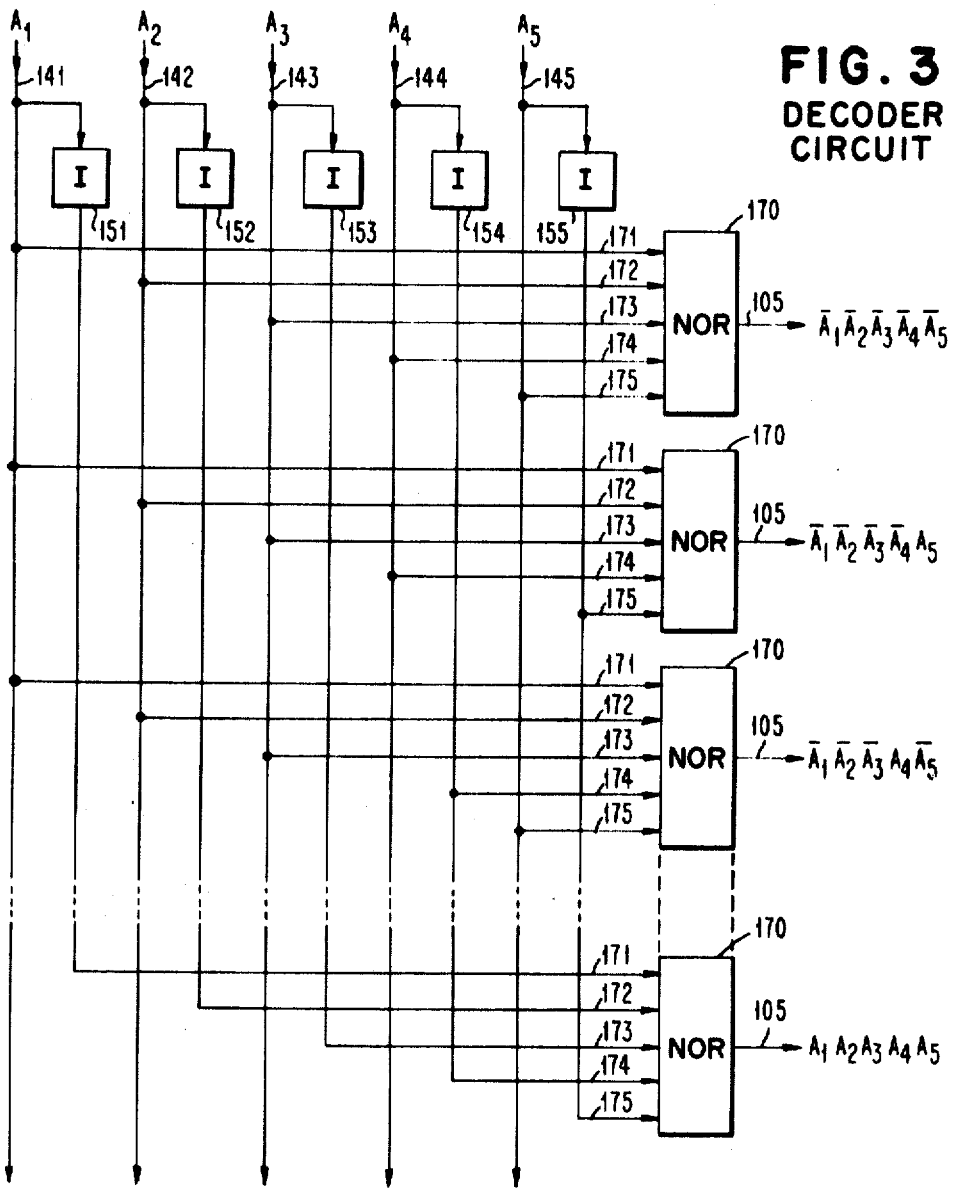
FIG. 3 is a block diagram of a decoder used in the word line decoder block in FIG. 1.

In FIG. 3, there is shown a block diagram of a decoder which may be used in the word line decoder 102 shown in FIG. 1. In FIG. 3, the reference characters $A_1$ to $A_5$ represent binary inputs to conductors 141 and 145. Binary inputs $A_1$ to $A_5$ emanate from a storage register (not shown) or the like and are applied to inverters 151 to 155 at the same time they are applied to conductors 141 to 145. The function of inverters 151 to 155 is to provide the complement of the input applied to conductors 141 to 145. Thus, a voltage excursion in a given interval on conductor 141 appears as ground at the output of inverter 151 and, a ground potential on conductor 141 appears as a voltage excursion at the output of inverter 151. Thus, if $A_1$ is a positive pulse (a binary 1), zero or ground appears at the output of inverter 151 during the pulse interval.

A typical inverter circuit is shown in FIG. 4. Inverters of this type may be substituted anywhere inverters have been mentioned in the specification. In FIG. 4, a field effect transistor 161 s shown connected to a source of voltage +V and to another series connected field effect transistor 162. An output connection 163 tends to be at a voltage +V when FET 161 is biased in the ON condition by a positive voltage $+V_1$ on its gate 164. Biasing FET 161 in the manner shown causes it to act as a substantially linear load device. FET 162 is normally OFF so that the potential +V appears at output terminal 163. When a signal $A_n$ appears on the gate 165 of FET 162, turning it ON, the potential +V is shorted via ground connection 166 to ground and a signal $A_n$ which is the complement of the signal $A_n$ appears at the output connection 163.

Returning now to FIG. 3, a plurality of NOR circuits are shown as blocks 170 each having a plurality of input leads 171–175, each of which is connected to one of the conductors 141 to 145 or to one of the inverters 151 to 155. The connections to NOR circuits 170 are made in such a way that each of the 32 possible combinations of conductors 141 to 145 and connections to inverters 151 to 155 are uniquely provided to a respective NOR circuit 170. Some of these unique pulse combinations are shown adjacent the NOR circuits 170 in FIG. 3. NOR circuits 170 operate in such a way that the absence of any potential on the input leads 171 to 175 of any of the NOR circuits 170 provides an output from that circuit. This condition can occur for any one NOR circuit 170 shown in FIG. 3 for a unique combination of inputs. Thus, for the uppermost NOR circuit 170, where the input leads 171 to 175 thereof are connected to conductors 141 to 145, respectively, an output is obtained where all the binary inputs to these connections are "zero" as represented by $A_1A_2A_3A_4A_5$ shown adjacent this circuit in FIG. 3. In like manner, when the input leads 171 to 175 of the lowermost of NOR circuits 170 are connected to inverters 151 to 155, respectively, an output is provided only when the binary inputs to conductors 141 to 145 are all "one" as represented by $A_1A_2A_3A_4A_5$ shown adjacent this circuit in FIG. 3.

As indicated hereinabove, the decoder of FIG. 3 may be modified to provide selection of a greater or lesser number of outputs. In FIG. 3, the output connections of NOR circuits have been labeled with the reference number 105, to relate this decoder to the decoder 102 shown in FIG. 10. Other decoding arrangements may be utilized in the practice of this invention, but the arrangement of FIG. 3 is desirable from the standpoint of few input lines.

Referring now to FIG. 5, there is shown a schematic of a NOR circuit 170 which is utilized in the practice of the present invention. NOR circuit 170 consists of a load FET 200 connected in series with a source of voltage +V and a group of parallel FET's 201 to 205. FET's 201 to 205 have one electrode thereof commonly connected to ground 206. Another electrode of FET's 201 to 205 is shown commonly connected to output lead 207. The gates of FET's 201 to 205 correspond to any of input leads 171 to 175 of FIG. 3. Output lead 207 is connected to the gate of a word-line gating FET 208 which is disposed in series with word driver lead 106 and word line 105. Word driver lead 106 is also shown in FIG. 1 and connects to a word driver (not shown).

To select the word line 105 as shown in FIG. 5, the binary potentials on leads 171 to 175 must be such that none of the FET's 201 to 205 is caused to conduct. Under such circumstances, when a pulse 209 having an amplitude +V is applied to the gate of FET 200 simultaneously with the binary signals on the gates of FET's 201 to 205, these latter FET's are held in a nonconducting state while the former conducts thereby applying the voltage +V on output lead 207. It should be apparent that if any of the FET's 201–205 are caused to conduct that the potential on output lead 207 can be designed to be nearly zero or ground potential when FET 200 is gated into conduction by pulse 209. The application of the potential +V on the gate of FET 208 causes that device to be placed in a conducting condition such that a pulse from the word driver along word driver lead energizes the selected word line 105.

The arrangement of word line decoder NOR circuit 170 and FET 208 serves to buffer the relatively large capacitive load of the word line 105 and provides faster overall operation.

In the foregoing description, the FET devices have been characterized as NPN devices for exemplary purposes. It should be appreciated that PNP devices could be used equally well by simply reversing the potentials applied to the NPN devices.

While the fabrication of the array of the present invention forms no part of the novel teaching disclosed herein, it should be appreciated that the array and the ancillary circuits can be formed in a semiconductor substrate by well-known diffusion, metallurgical, and photolithographic techniques. All of the discrete devices such as FET's and resistors can be formed by resorting to diffusions through etched masks of silicon dioxide or silicon nitride and growth of suitable gate oxides. Contacts, metallization and interconnections can be formed by deposition, masking and etching techniques well known to those skilled in the art of integrated circuit fabrication.

The practice of the present invention is not dependent on the use of specific voltage, current or power parameters. It should be appreciated that the combination described hereinabove may be utilized in a variety of environments and under a wide variety of design considerations. Further, it should also be appreciated that only one array of 512 bits has been shown. Normally, a large number of these arrays are provided, a single output from groups of chips in parallel providing a binary word.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A bit oriented memory array comprising, in combination,
   - an array of memory cells each of which stores information via word and bit conductors, and,
   - bit line biasing means coupled to said bit conductors for maintaining the voltage on unselected ones of said conductors above a given level when certain of said conductors are selected.

2. A bit-oriented memory array according to claim 1 wherein said bit line biasing means includes a voltage source and switching means coupled between said source and said bit conductors.

3. A bit-oriented memory array according to claim 2 further including means coupled to said switching means for energizing said switching means to periodically apply a voltage from said source to said bit conductors.

4. A bit-oriented memory array according to claim 2 wherein said switching means is a transistor.

5. A bit-oriented memory array according to claim 4 wherein said transistor is a field effect transistor.

6. A bit-oriented memory according to claim 1 wherein said bit line biasing means includes a voltage source and high impedance means coupled between said source and said bit conductors.

7. A bit-oriented memory array according to claim 6 wherein said high impedance means is a resistive element.

8. A bit-oriented memory array according to claim 1 further including decoding means adapted to select one of said word conductors said word conductor being associated with a group of said memory cells.

9. A bit-oriented memory array according to claim 8 further including means connected to said word conductors for applying a potential to said group of memory cells.

10. A bit-oriented memory array according to claim 8 wherein said decoding means includes a switchable element serially disposed in each of said word conductors.

11. A bit-oriented memory array according to claim 10 wherein said switchable element is a field effect transistor.

12. A bit-oriented memory array according to claim 8 wherein said decoding means further includes a plurality of signal leads, a plurality of signal inverting means, one of said signal inverting means being connected to one of said signal leads, a plurality of logic circuits having as many inputs as there are signal leads, each of said inputs being connected to a combination of signal leads and signal inverting means such that one of said logic circuits provides an output when said signal leads are energized with a predetermined voltage pattern.

13. A bit-oriented memory array according to claim 12 wherein said signal inverting means is an inverter circuit comprising a pair of field effect transistors serially disposed between a source of potential and ground, one of said field effect transistors being biased in the ON condition to apply the voltage of said source at a node between said pair of transistors, the other of said transistors biased in the OFF condition being responsive to a signal on its gate to reduce the voltage at said node to substantially zero volts.

14. A bit-oriented memory array according to claim 12 wherein said logic circuits are NOR circuits and comprise:
   - a source of voltage,
   - a gated load field effect transistor disposed in series with said source,
   - a group of gated field effect transistors, each of the group being disposed in parallel with the others and in series with said load field effect transistor,
   - means coupled to said gated load field effect transistor for applying the voltage of said source at a node between said gated load field effect transistor and said group of gated field effect transistors at selected intervals, said inputs being connected to said group of gated field effect transistors, one input to one gate, respectively, the voltage at said node being maintained during said selected intervals when the inputs to the gates of said group of field effect transistors maintain each of said group in the OFF condition.

15. A bit-oriented memory array according to claim 14 wherein said means for applying the voltage of said source at a node at selected intervals includes a pulsed source connected to said load field effect transistor which turns said load field effect transistor ON.

16. A bit-oriented memory array according to claim 1 further including decoding means adapted to select a pair of said bit conductors, said pair of bit conductors being associated with a portion of said memory cells.

17. A bit-oriented memory array according to claim 1 further including means connected to said bit conductors for applying potentials to said portion of said memory cells.

18. A bit-oriented memory array according to claim 17 wherein said decoding means includes a switchable element serially disposed in each of said bit conductors.

19. A bit-oriented memory array according to claim 18 wherein said switchable element is a field effect transistor.

20. A bit-oriented memory array according to claim 16 wherein said decoding means includes a plurality of signal leads, a plurality of signal inverting means, one of said signal inverting means being connected to one of said signal leads, a plurality of logic circuits having as many inputs as there are signal leads, each of said inputs being connected to a combination of signal leads and signal inverting means such that only one of said logic circuits provides an output when said signal leads are energized with a predetermined voltage pattern.

21. A bit-oriented memory array according to claim 20 wherein said signal inverting means is an inverter circuit comprising a pair of field effect transistors serially disposed between a source of potential and ground, one of said field effect transistors being biased in the ON condition to apply the voltage of said source at a node between said pair of transistors, the other of said transistors biased in the OFF condition being responsive to a signal on its gate to reduce the voltage at said node to substantially zero volts.

22. A bit-oriented memory array according to claim 20 wherein said logic circuits are NOR circuits and comprise:

a source of voltage, a gated load field effect transistor disposed in series with said source, a group of gated field effect transistors each of the group being disposed in parallel with the others and in series with said load field effect transistor, means coupled to said gated load field effect transistor for applying the voltage of said source at a node between said gated load field effect transistor and said group of gated field effect transistor at selected intervals, inputs being connected to said group of gated field effect transistors, one input to one gate, respectively, the voltage at said node being maintained during said selected intervals when the inputs to the gates of said group of field effect transistors maintain each of said group in the OFF condition.

23. A bit-oriented memory array according to claim 22 wherein said means for applying the voltage of said source at a node at selected intervals includes a pulsed source connected to said load field effect transistor which turns said load field effect transistor ON.

24. A bit-oriented memory array which stores information in field effect transistor bistable circuits by charging the gate capacitance of one of the field effect transistors to the power supply voltage of said cell via word and bit conductors characterized by means for charging the bit conductor capacitance of said bit conductors to approximately said power-supply voltage during intervals when said bit conductors are unselected.

25. A bit-oriented memory according to claim 24 wherein said means for charging the bit conductor capacitance includes a source of voltage and means for electrically connecting said source to said bit conductors.

26. A bit-oriented memory according to claim 25 wherein said means for electrically connecting said source to said bit conductors includes a resistor disposed in series with said source and said bit conductors.

27. A bit-oriented memory according to claim 25 wherein said means for electrically connecting said source to said bit conductors includes a switchable transistor disposed in series with said source and said bit conductors.

28. A method for eliminating false writing of unselected memory cells of a bit-oriented memory array each of which stores information in a field effect transistor bistable circuit by charging the gate capacitance of one of the field effect transistors of said bistable circuit to a given power supply voltage via word and bit conductor comprising the step of:

applying a potential of approximately said given voltage to the bit conductors associated with unselected memory cells to charge up the bit conductor capacitance to said given voltage.

29. A method according to claim 28 wherein the step of applying a potential is carried out continuously.

30. A method according to claim 28 wherein the step of applying a potential is carried out intermittently.